United States Patent Office 3,713,769
Patented Jan. 30, 1973

3,713,769
PROCESS FOR THE DYEING OF AROMATIC POLYAMIDE FIBRES
Walter Beal, Cheadle Hulme, Cyril Hobday, East Didsbury, James Jack, Bramhall, and John Francis Edmund Keenan, Cheadle Hulme, England, assignors to Ciba-Geigy Corporation, Ardsley, N.Y.
No Drawing. Filed Dec. 22, 1970, Ser. No. 100,843
Claims priority, application Great Britain, Dec. 23, 1969, 62,554/69
Int. Cl. D06p 5/04
U.S. Cl. 8—173                     12 Claims

ABSTRACT OF THE DISCLOSURE

Process for the dyeing of aromatic polyamide fibres, particularly aromatic polyamide fibres having a highly crystalline physical structure wherein said fibres are dyed with an aqueous dye liquor containing a cationic or disperse dye and at least one compound having the formula

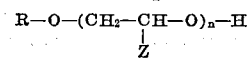

wherein R is phenyl or a chloro-substituted phenyl group, Z is hydrogen or methyl and $n$ is an integer from 1 to 3, and each Z being, independently from each other, hydrogen or methyl when $n$ is 2 or 3, obtaining on said fibres an excellent colour yield.

DESCRIPTION OF THE INVENTION

The present invention relates to a process for the dyeing of aromatic polyamide fibres.

It is well known that conventional methods of dyeing certain synthetic polyamide fibres having a highly crystalline physical structure are not satisfactory. We have found, surprisingly, that when the dyeing of such fibres is carried out in the presence of certain phenoxyethanol derivatives, extremely good results are obtained.

According to the present invention there is provided a process for the dyeing or printing of aromatic polyamide fibres having a highly crystalline physical structure comprising treating said fibres with an aqueous dye liquor containing a cationic or disperse dye and at least one compound having the Formula I

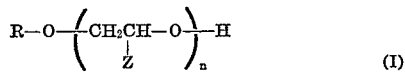  (I)

wherein R is a phenyl or chloro-substituted phenyl group, Z is hydrogen or a methyl group and $n$ is an integer from 1 to 3, and each Z being, independently from each other, hydrogen or methyl when $n$ is 2 or 3.

The compound of Formula I may be envisaged as the condensation product of a phenolic derivative with ethylene oxide or propylene oxide or with mixed ethylene oxide and propylene oxide.

A preferred fibre is one derived from an aromatic polyamide as hereinafter defined. Such an aromatic polyamide is one having an inherent viscosity measured in concentrated sulphuric acid at 30° C. of at least 0.6, and a melting point of at least 300° C. which polyamides are made up of the structural unit:

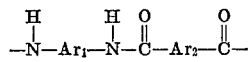

wherein $Ar_1$ and $Ar_2$ are the same or different and are substituted or unsubstituted divalent aromatic radical in which the chain extending bonds are not ortho oriented with respect to each other or to bonds linking one aromatic ring directly or through a linking group to another aromatic ring, the substituent groups (if any) in the aromatic rings being groups which do not react with amino or halide groups during polymerisation and the total number of carbon atoms in substituent groups attached to any one aromatic ring not exceeding nine, subsject to the proviso that at most 10 mol percent of the $Ar_1$ radicals and at most 10 mol percent of the $Ar_2$ radicals may be replaced by nonaromatic radicals. The polyamide is preferably "wholly aromatic"; that is to say, none of the $Ar_1$ radicals or $Ar_2$ radicals are replaced by non-aromatic radicals.

The invention is particularly applicable to polyamides having an inherent viscosity, measured as described above, of at least 0.8. One such polyamide is poly (meta-phenylene isophthalamide), and an example of a commercial fibre of an aromatic polyamide fibre on which the method of the present invention gives particularly advantageous results is that sold under the Trademark "Nomex" such as Nomex Type 430 or 450. Such fiber is a poly (meta-phenylene isophthalamide).

Cationic dyes which may be used in the process of the present invention may contain onium groupings such as ammonium, sulphonium or phosphonium groups.

For instance, the usual salts of cationic dyestuffs, e.g. the halides, sulphates, alkyl sulphates, aryl sulphonates or metal halide double salts such as zinc chloride double salts, of a wide variety of cationic dyestuffs may be used. In particular cycloammonium salts of methine, azamethine, triazene or especially of monoazo dyestuffs may be used. Alternatively, cationic dyestuffs of the diphenylmethane, triphenylmethane, oxazine or thiazine series may also be used according to the present invention. As a further possibility, salts of cationic dyestuffs of the arylazo or anthraquinone series having an external onium group, for example an alkylammonium or cycloammonium group and the benzo-1, 2 pyrane dye salts containing cyclammonium groups may be used.

Particularly suitable in the colouring process according to the invention is the use of cycloammonium azo dye salts corresponding to Formula II

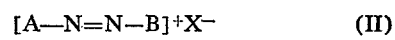

$$[A-N=N-B]^+X^-$$  (II)

The symbols in this formula have the following meanings:
A represents the radical of an optionally benzocondensed N-quaternated azole or azine ring, preferably a thiazolium, benzthiazolium, imidazolium, benzimidazolium, pyridinium, quinolinium, pyrazolinium, indazolium triazolium or thiadiazolinium radical.

B represents the radial of a coupling component free of hydroxyl groups in the nucleus and enolisable keto groups, especially a p-aminophenyl radical or -naphthyl radical, a 3-indazolyl, 3-indolyl, 2,4,6-triamino-5-pyrimidyl or 5-amino-4-pyrazolyl radical, and $X^-$ represents the anionic acid equivalent.

Disperse dyes which may be used include for instance, an azo, anthraquinone, nitro, methine, styrene, azostyrene, nitroacridone, coumarine, naphthoperinone, quinophthalone or naphthoquinone imine dyestuff.

The amount of dye that is used may vary depending upon the circumstances and may be an amount up to 10% by weight based on the weight of fibre. Cationic dyes are preferred.

The dyeing process according to the invention is preferably carried out using a compound of Formula I wherein R and $n$ are as previously defined and Z is hydrogen.

Suitable compounds having the Formula I which may be used in the process of the present invention are, for instance, phenoxyethanol, compounds derived from condensation of one or three moles of ethylene oxide or one mole of propylene oxide with one mole of monochlorophenol, such as o-chlorophenol, m-chlorophenol or p-chlorophenol or with any mixture of isomeric monochlorophenols, and compounds derived from condensation of one mole of ethylene oxide or propylene oxide with one mole of dichlorophenol or trichlorophenol.

Especially satisfactory results of broad applicability to a great variety of dyestuffs are obtained with these compounds of Formula I which are condensation products of one mole of ethylene oxide and one mole of a mixture of ortho-chlorophenol and para-chlorophenol in a weight ratio of from 1:4 to 1:6, specifically that mixture containing 20% by weight of o-chlorophenol and 80% by weight of p-chlorophenol.

In certain circumstances, it is desirable to combine the compound of Formula I with a water-soluble alcohol or a ketone having at most 5 carbon atoms which is miscible with the compound of Formula I, for example, methylated spirits, isopropyl alcohol, ethylene glycol, methyl ethyl ketone or monoethers of ethylene glycol, such as ethylene glycol monomethyl ether or ethylene glycol mono butyl ether.

The compounds having the Formula I may also be used, if desired, in admixture with an organic solvent described in British patent specification No. 856,381, which is liquid under the conditions of the dyeing of the present invention. A particularly preferred solvent of this type is benzyl alcohol. Particularly advantageous results are obtained in dyeing when the proportion of benzyl alcohol is within the range of from 20% to 50%, and especially from 20% to 30%, by volume based on the total volume of the mixture benzyl alcohol and compound of Formula I.

The amount of the compound having the Formula I or the mixture thereof with an organic solvent as hereinbefore defined, especially benzyl alcohol, used in the process of the present invention may be within the range of from 0.25% to 5%, and preferably from 1% to 3% by volume, based on the total volume of the dye liquor.

The process according to the present invention may conveniently be carried out batchwise; or, if desired, the process may be carried out continuously, for instance by padding or printing followed by steaming. The temperature at which the dye is applied will normally be at least 100° C. and not higher than 140° C.; a preferred range of temperature is from 120° to 135° C.

Where the process is carried out batchwise, the compound having the Formula I may be added directly to the dyebath and the polyamide fibre may be immersed in the aqueous dye liquor thus formed. The duration of the dyeing will depend on the circumstances, but generally a period of from 30 minutes to 3 hours will suffice. From 5% to 30% by weight of fibre based on the weight of aqueous dye liquor will normally be dyed in such a dyebath, and for optimum results we restrict to from 10% to 25% by weight.

There may also be present, if desired, in the aqueous dye liquor, inorganic or organic acids and/or the water-soluble salts thereof to adjust the pH of the dyebath in order to achieve exhaustion onto the fibre. Suitable acids or salts are for example sulphuric acid, phosphoric acid, ammonium acetate, ammonium sulphate, alkyl or aryl sulphonic acid, formic acid, lactic acid, chloracetic acid and particularly acetic acid. They are preferably used in amounts from 0.25% to 5% by weight based on the total weight of fibre to be dyed.

The presence of neutral salts that are conventionally used in dyeing processes is particularly advantageous in the process of the present invention, for example sodium sulphate or sodium chloride. The amount of neutral salt used is preferably in the range of from 10% to 30% by weight based on the weight of fibre to be dyed.

If desired a surface active agent may be present which is preferably cationic or non-ionic.

Where a printing or padding process is used, an optionally thickened liquor containing dye, acid or acid salt and the compound of Formula I is printed or padded onto the fibre, preferably at a temperature between 10° C. and 40° C. The padded or printed fibre material may then be steamed, preferably with steam at superatmospheric pressure for a period from 10 to 30 minutes.

The process of the present invention gives an outstanding colour yield on the materials which are dyed, the colour yield being superior to that obtained when a conventional assistant such as benzyl alcohol alone is used.

The following examples further illustrate the present invention. In these examples parts and percentages are expressed by weight unless otherwise stated. Parts by weight shown therein bear the same relation to parts by volume as do kilograms to litres. The temperatures are given in degrees centigrade.

EXAMPLE 1

4 parts of Nomex aromatic polyamide yarn were immersed in 40 parts by volume of an aqueous solution containing:

(a) 0.1 part of a dyestuff having the formula:

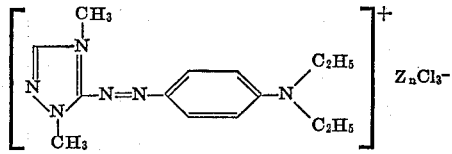

(b) 0.08 part of 40% aqueous acetic acid
(c) 0.8 part by volume of a compound derived from condensation of 1 mole of ethylene oxide with 1 mole of a mixture comprising 20% o-chlorophenol and 80% p-chlorophenol.

The dyeing was carried out in a pressure dyeing apparatus at a temperature of 130° C. for 2 hours. On completion of the dyeing period the yarn was rinsed, scoured and dried. An excellent colour yield resulted.

Comparative Example A

By following a similar procedure to that described in Example 1, but omitting component (c) from the dyebath a poor depth of shade was obtained.

Comparative Example B

By following a similar procedure to that described in Example 1, but using 4 parts of benzyl alcohol instead of 0.8 parts component (c) there used, only a moderate depth of shade was obtained.

EXAMPLE 2

The procedure described in Example 1 was repeated with the addition of 0.8 part of sodium chloride to the bath; an even greater colour yield was obtained than that obtained in Example 1.

EXAMPLE 3

The procedure described in Example 2 was repeated using however 0.2 part of dye instead of the 0.1 part there used; an excellent colour yield was obtained.

EXAMPLE 4

The procedure described in Example 1 was repeated using however a dyestuff having the formula

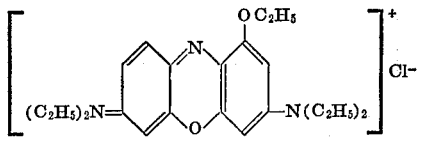

instead of the dye there used; an excellent colour yield was obtained.

EXAMPLE 5

The procedure described in Example 2 was repeated using however the dyestuff having the formula given in Example 4 instead of the dye there used; an excellent colour yield was obtained.

EXAMPLE 6

The procedure described in Example 3 was repeated using however a dyestuff having the formula:

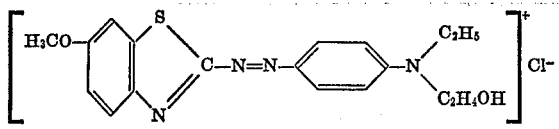

instead of the dye there used; an excellent colour yield was obtained.

EXAMPLE 7

The procedure described in Example 1 was repeated using however 0.8 part by volume of a mixture containing 40%, 2,4-dichlorophenoxyethanol and 60% of a compound derived from the condensation of 1 mole of ethylene oxide with 1 mole of a mixture comprising 20% o-chlorophenol and 80% p-chlorophenol instead of component (c); an excellent colour yield resulted.

EXAMPLE 8

The procedure described in Example 1 was repeated using however 0.8 part by volume of a compound derived from 3 moles of ethylene oxide per mole of a mixture comprising 20% o-chlorophenol and 80% p-chlorophenol instead of component (c); an excellent colour yield resulted.

If in the above examples the dye salt components are replaced by corresponding amounts of the salt of cationic dye-stuffs which are listed in the following table, column 2, the procedure being otherwise as in the Examples 1 to 8, then likewise are obtained dyeings of the shades given in the last column of that table, which have similar satisfactory properties.

TABLE

| Example No. | Salt of cationic dyestuffs | Shade on aromatic polyamide fibres |
|---|---|---|
| 9 | | Red. |
| 10 | | Red. |
| 11 | | |
| 12 | | Scarlet. |
| 13 | | Orange. |
| 14 | | Violet |
| 15 | | Do. |
| 16 | | Orange. |

TABLE—Continued

| Example No. | Salt of cationic dyestuffs | Shade on aromatic polyamide fibres |
|---|---|---|
| 17 | (structure) | Yellow. |
| 18 | (structure) | Scarlet. |
| 19 | (structure) | Red. |
| 20 | (structure) | Yellow. |
| 21 | (structure) | Red. |
| 22 | (structure) | Red. |
| 23 | (structure) | Yellow orange. |
| 24 | (structure) | Red. |
| 25 | (structure) | Blue. |

TABLE—Continued

| Example No. | Salt of cationic dyestuffs | Shade on aromatic polyamide fibres |
|---|---|---|
| 26 | (structure with H₃CO-benzothiazole-N=N-phenyl-N(C₂H₅)₂, N-CH₂CH₂CONH₂, Cl⁻) | Blue. |
| 27 | (structure with H₃CO-benzothiazole-N=N-phenyl-N(C₂H₅)₂, N-C₂HCH₂CN, Cl⁻) | Do. |
| 28 | (thiazole-N=N-indole structure, CH₂CH₂CN, H₃C, Cl⁻) | Red. |
| 29 | (bis-indazole/indole structure with O₂N, N-CH₃, H₃C, SO₄/2⁻) | Green. |
| 30 | (nitro-indazole-N=N-naphthyl-N(CH₃)₂, Cl⁻) | Navy blue. |
| 31 | (indoline-CH=CH-phenyl-N(CH₃)₂, SO₄/2⁻) | Red. |
| 32 | (benzimidazole-CH=N-N-benzothiazole, N-CH₃, Cl⁻) | Orange. |
| 33 | (Br, CH₃O, OCH₃ naphthalene fused ring structure with N-CH₃, Cl, SO₄CH₃⁻) | Yellow. |
| 34 | (triazole with CH₃ groups-N=N-phenyl-N(CH₃)(CH₂-phenyl), NO₃⁻) | Red. |

TABLE—Continued

| Example No. | Salt of cationic dyestuffs | Shade on aromatic polyamide fibres |
|---|---|---|
| 35 | [structure with CH₃-C, CH₃-N, indole group, N=N linkage] SO₄CH₃⁻ | Yellow. |
| 36 | [benzothiazole structure with N=N-N(CH₃)- phenyl-NO₂] Cl⁻ | Do. |
| 37 | [H₃CO-benzothiazole with N=N-N(CH₃)- phenyl-NO₂] ZnCl₃⁻ | Do. |
| 38 | [H₃C-N=C-phenyl-N(CH₃)-phenyl, naphthalene] CH₃SO₄⁻ | Blue. |
| 39 | [oxazine with H₅C₂, H₅C₂N and C₂H₅, C₂H₅N] Cl⁻ | Do. |
| 40 | [(CH₃)₂N-phenyl=C(phenyl)-phenyl-N(CH₃)₂] Cl⁻ | Green. |
| 41 | [(CH₃)₂N-phenyl=C(phenyl)-phenyl-N(CH₃)₂, with additional phenyl-N(CH₃)₂] Cl⁻ | Violet. |

EXAMPLE 42

The procedure described in Example 1 was repeated, using however the product derived from condensation of 1 mole of propylene oxide with 1 mole of a mixture of 20% o-chlorophenol and 80% p-chlorophenol instead of component (c); an excellent colour yield resulted.

EXAMPLE 43

The procedure described in Example 1 was repeated, using however the product formed by condensing 2 moles of ethylene oxide and 1 mole of propylene oxide with a mixture of 20% o-chlorophenol and 80% p-chlorophenol, instead of component (c); an excellent colour yield resulted.

EXAMPLE 44

4 parts Nomex aromatic polyamide yarn were immersed in 40 parts by volume of an aqueous solution containing:

(a) 0.2 parts of a dyestuff having the formula

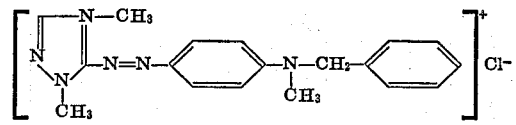

(b) 0.08 parts of 40% aqueous acetic acid
(c) 5.0 parts by volume phenoxyethanol
(d) 0.8 parts sodium chloride The dyeing was carried out at a temperature of 130° C. for 2 hours. On completion of the dyeing period the yarn was rinsed, scoured and dried. A good colour yield was obtained.

EXAMPLE 45

4 parts Nomex aromatic polyamide yarn were immersed in 40 parts by volume of an aqueous solution containing:

(a) 0.2 parts of the dyestuff having the formula given in Example 44

(b) 0.08 part of 40% aqueous acetic acid
(c) 2.0 parts by volume of a mixture (50/50) of phenoxyethanol and benzyl alcohol
(d) 0.8 part sodium chloride.

The dyeing was carried out for 2 hours at a temperature of 130° C. On completion of dyeing period the yarn was rinsed, scoured and dried. A moderate colour yield resulted.

EXAMPLE 46

4 parts Nomex aromatic polyamide yarn were immersed in 40 parts by volume of an aqueous solution containing:

(a) 0.16 part of the dyestuff having the formula

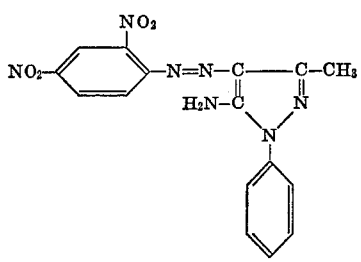

(b) 0.08 parts of 40% aqueous acetic acid
(c) 5.0 parts by volume phenoxyethanol
(d) 0.8 parts sodium chloride The dyeing was carried out for 2 hours at 130° C. On completion of the dyeing period the yarn was rinsed, scoured and dried. A moderate colour yield was obtained.

EXAMPLE 47

4 parts Nomex aromatic polyamide yarn were immersed in 40 parts by volume of an aqueous solution containing:

(a) 0.16 parts of the dyestuff having the formula given in Example 47
(b) 0.08 part of 40% aqueous acetic acid
(c) 2.0 parts by volume monochlorphenoxyethanol
(d) 0.8 part sodium chloride.

The dyeing was carried out for 2 hours at 130° C. On completion of the dyeing period the yarn was rinsed, scoured and dried. A moderate colour yield was obtained.

EXAMPLE 48

A length of Nomex aromatic polyamide fabric was passed through a padding liquor containing:

(a) 2 parts of the dyestuff having the formula given in Example 44
(b) 3 parts of 80% aqueous acetic acid
(c) 1.6 parts of a locust bean gum derivative as thickener
(d) 2 parts by weight of monochlorphenoxyethanol
(e) water to make up to 100 parts.

The saturated material was passed between the rollers of a mangle to remove excess solution and was then steamed for 10 minutes at a temperature of 105° C. After steaming the material was rinsed well in cold water, and dried.

The Nomex fabric was dyed to a deep pink shade.

By comparison, a length of Nomex aromatic polyamide fabric passed through a padding liquor formulated as above but without component (d) and otherwise similarly treated was dyed to a pink shade much paler than that obtained in the example.

EXAMPLE 49

Nomex aromatic polyamide yarn was passed through a yarn printing machine and was then impregnated with a solution containing:

(a) 2 parts of the dyestuff having the formula given in Example 6
(b) 3 parts of 80% aqueous acetic acid
(c) 1.6 parts of a locust bean gum derivative as thickener
(d) 2 parts by weight of monochlorphenoxyethanol
(e) water to make up to 100 parts.

The impregnated yarn was steamed for 10 minutes at a temperature of 105° C. After steaming the material was rinsed well in cold water and dried.

The yarn was dyed to a medium blue shade. By comparison Nomex yarn printed with a solution formulated as above but without component (d) and otherwise similarly treated was dyed to a blue shade much paler than that obtained in the example.

We claim:

1. A process for the dyeing of a fiber comprising poly (meta-phenyleneisophthalamide) having a highly crystalline physical structure comprising treating said fibres with a cationic or disperse dye in an aqueous medium consisting essentially of at least one compound having the Formula I

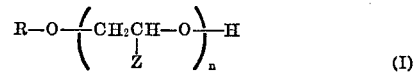

wherein:
R is phenyl or chlorophenyl,
Z is hydrogen or methyl,
n is 1, 2 or 3, and
each Z being, independently from each other, hydrogen or methyl when n is 2 or 3, at a temperature of from 100° to 140° C.

2. A process as claimed in claim 1 wherein Z is hydrogen.

3. A process as claimed in claim 2 wherein R is phenyl, Z is hydrogen and n is 1.

4. A process as claimed in claim 2 wherein R is monochlorophenyl, Z is hydrogen and n is 1.

5. A process as claimed in claim 4 wherein the compound of Formula I is derived from condensation of 1 mole of ethylene oxide with 1 mole of a mixture containing 20% by weight of o-chlorophenol and 80% by weight of p-chlorophenol.

6. A process as claimed in claim 1 wherein R is monochlorophenyl, Z is methyl and n is 1.

7. A process as claimed in claim 1 wherein R is dichlorophenyl and n is 1.

8. A process as claimed in claim 1 wherein the compound of Formula I is in admixture with benzyl alcohol.

9. A process as claimed in claim 1 wherein the amount of compound having the Formula I or the mixture thereof with benzyl alcohol is within the range of from 0.25% to 5% by volume based on the total volume of the dye liquor.

10. A process as claimed in claim 9 wherein the amount of the compound having the Formula I or the mixture thereof with benzyl alcohol is within the range of from 1% to 3% by volume based on the total volume of the dye liquor.

11. A process as claimed in claim 1 wherein the temperature at which dyeing is carried out is from 120° to 135° C.

12. A process as claimed in claim 1 wherein the dyestuff is a cationic dyestuff containing onium groupings.

(References on following page)

References Cited

UNITED STATES PATENTS

| | | | |
|---|---|---|---|
| 3,506,990 | 4/1970 | Richardson et al. | 8—178 R |
| 3,056,644 | 10/1962 | Radley et al. | 8—93 |
| 3,313,590 | 4/1967 | Delano et al. | 8—173 |
| 3,402,986 | 9/1968 | Zviak et al. | 8—93 X |
| 3,349,062 | 10/1967 | Hill et al. | 8—178 R X |
| 3,558,267 | 1/1971 | Langenfield | 8—178 R X |

OTHER REFERENCES

H. F. Mark, Textile Chemist and Colorist, January 1972, vol. 4, No. 1, pp. 9–13.

GEORGE F. LESMES, Primary Examiner
T. J. HERBERT, Jr., Assistant Examiner

U.S. Cl. X.R.

8—93, 178